March 3, 1942. S. KRASNOW ET AL 2,274,903
ELECTRICAL PROSPECTING APPARATUS
Filed Feb. 6, 1937 4 Sheets-Sheet 3

INVENTORS
SHELLEY KRASNOW
JOS. M.S. KAUFMAN
BY
Shelley Krasnow
ATTORNEYS.

March 3, 1942. S. KRASNOW ET AL 2,274,903
ELECTRICAL PROSPECTING APPARATUS
Filed Feb. 6, 1937 4 Sheets-Sheet 4

INVENTORS
SHELLEY KRASNOW
JOS. M.S. KAUFMAN
BY Shelley Krasnow
ATTORNEYS.

Patented Mar. 3, 1942

2,274,903

UNITED STATES PATENT OFFICE 2,274,903

ELECTRICAL PROSPECTING APPARATUS

Shelley Krasnow, New York, N. Y., and Joseph M. S. Kaufman, Washington, D. C.

Application February 6, 1937, Serial No. 124,516

2 Claims. (Cl. 175—182)

This invention relates to electrical prospecting apparatus of the type in which are measured the electrical properties of selected portions of the earth included between, or proximate to, spaced electrodes.

One object of the invention is to provide a convenient apparatus for the purpose described, which will allow measurements to be made with facility. Another object is to provide means by which the apparatus can be conveniently standardized. Still another object is to provide an apparatus which can be adapted easily to serve for two or more techniques of measurement. Still another object of the invention is to provide an apparatus which may be used for the "direct current earth resistivity" technique. Still another object of the invention is to provide an apparatus which may be used for the "commutated direct current earth resistivity" technique.

In the embodiment of the invention described below:

Figure 1:
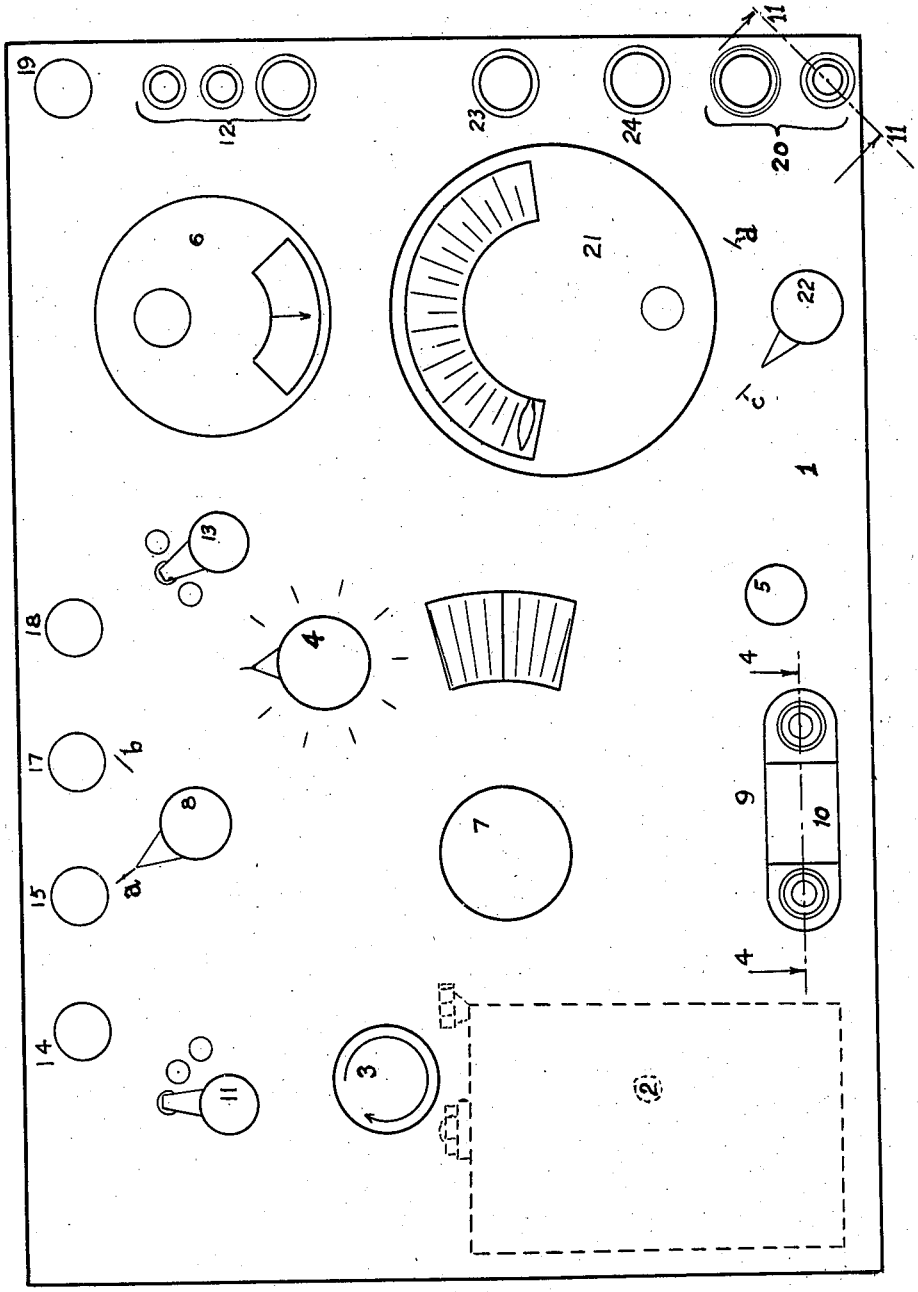
Fig. 1 is a plan view of the panel of the apparatus.

For convenience in description, the apparatus will be considered as having two circuits, the "potential" circuit and the "current" circuit. The components of the two circuits are mounted upon an insulating panel 1, though it is understood that by the proper use of insulating mountings, a panel of conducting material may be employed. In the "potential" circuit, which is adapted to measure E. M. F. by the potentiometric method, 2 is a battery of a conventional type, mounted on the underside of the panel 1, and shown in dotted outline in Fig. 1. The battery 2 is inserted in the "slide wire" circuit of the "potential" system of the apparatus. A rheostat 3 is provided to control the current flowing in the "slide wire" circuit. 4 is a coarse slide wire adjustment, the movable contact of which is connected to one of the movable contacts of a double-pole double-throw reversing switch 8. In the slide wire circuit is a jack 9, in which is normally kept a plug 10. A standard resistance 10a is mounted upon the plug 10, and has its terminals connected to the contacts of the plug 10. The value of the resistance 10a is best made that of the milliammeter 21. The plug 10 and jack 9 are polarized, so that they can be fitted together in only one way. In the particular modification shown, the polarizing of the jack is attained by making one of the sockets of the jack 9 of different diameter than the other. A stationary contact of the switch 8 is connected to the galvanometer 6. One of the movable contacts of switch 8 is connected to the movable contact of a single-pole, triple-throw switch 11, and also to one of the contacts of the triple contact jack 12. The other movable contact is connected to the movable contact of the single-pole triple-throw switch 13, and also to one of the contacts of the jack 12. Switch 8 has two positions, designated as "a" and "b." Switch 11 can make contact either with a lead to binding post 14, that to binding post 15, or to common lead 16. Similarly, switch 13 can make contact with common lead 16, binding post 17, or binding post 18. Lead 16 is connected to binding post 19, which is also connected to one of the contacts of jack 12.

In the "current" circuit, 20 is a polarized, double contact jack. One lead from this extends to the milliammeter 21, the other lead going to one movable contact of a double-pole, double-throw reversing switch 22. A lead from the milliammeter 21 extends to the other movable contact of the switch 22. The stationary contacts of the switch 22 are connected to the binding posts 23 and 24. The switch 22 has the two possible positions designated as "c" and "d." A shielding system is provided, consisting of shields 25a, 25b, 25c, 25d, 25e and 25f, placed about the conducting parts of the milliammeter, switch, binding posts, and jack elements, respectively. These shields are connected to a common lead 26, which is in turn connected to that contact of jack 12, which is connected to binding post 19.

Figure 5:
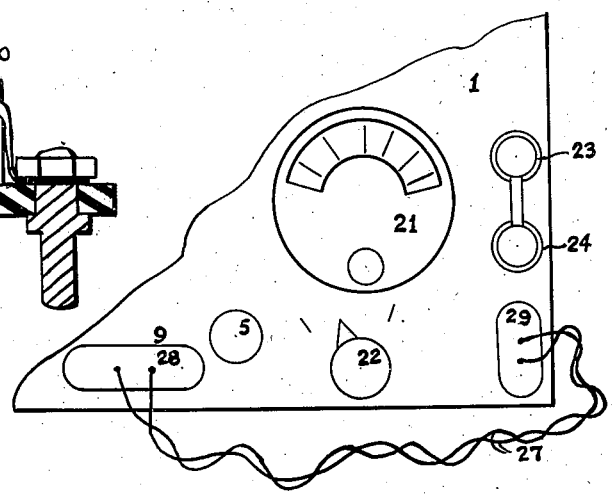
Fig. 5 is a diagrammatic view of the panel of the apparatus, showing connections made for standardizing.
Figure 3:
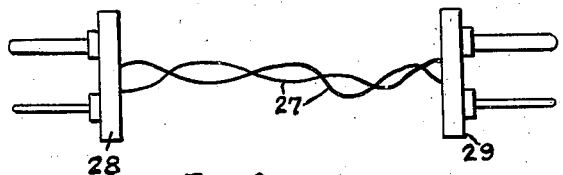
Fig. 3 is a view showing a cable and plugs used for standardizing the apparatus by one method.
Figure 6:
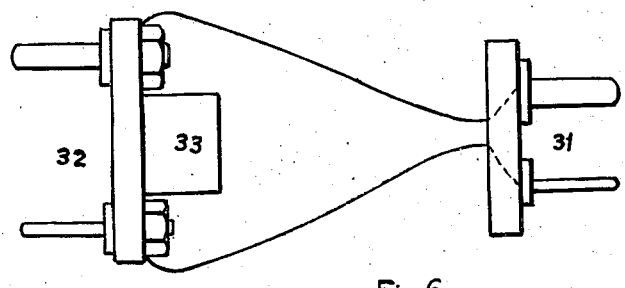
Fig. 6 is a view showing a cable assembly for standardizing by another method.
Figure 7:
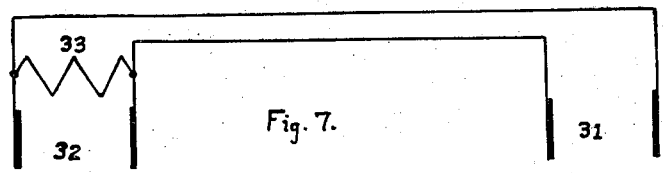
Fig. 7 is a wiring diagram of the cable assembly shown in Fig. 6.
Figure 10:
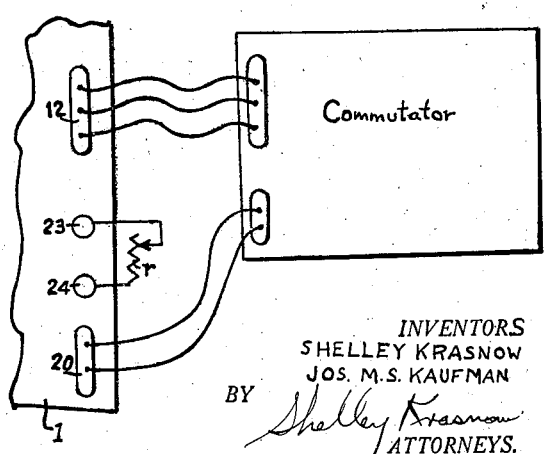
Fig. 10 is a diagrammatic view of the apparatus, showing connections made for following another measuring technique.

To standardize the E. M. F. measuring system, two pieces of auxiliary equipment are provided, so that it is possible to standardize in two different ways. One of these, shown in Fig. 3, consists of a double conductor cable 27, having at one end a plug 29, adapted to fit in jack 9, and at the other end a plug 28, adapted to fit into jack 20. The other standardizing device is shown in Fig. 5. It consists of a double conductor cable 30 connected at one end to a plug 31 adapted to fit into two of the contacts of jack 12. At the other end is a plug 32 adapted to fit into jack 20. A standard resistance 33 is connected across the jack 32, as shown in Fig. 6.

Figure 11:
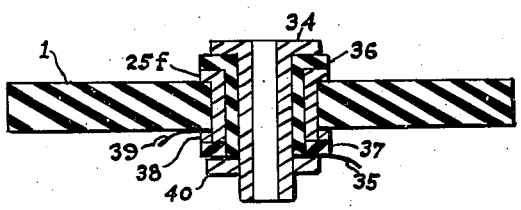
Fig. 11 shows a cross-section of the panel of the apparatus, taken across the section lines 11—11.

In Fig. 11 is shown a detail of one of the elements in the "current" circuit. One of the contact elements of jack 20 has been selected as a typical current carrying element. This element, numbered 34 is of metal, and has electrical connection made to it by means of a lug 35. Surrounding the element 34, is an insulating bushing 36, around the lower end of which is an insulating washer 37. Surrounding the bushing 36, is a conducting, in this case a metallic, bushing 25f. Around the lower portion of bushing 25f is a conducting ring 38. Under this ring is a lug 39, which serves to make electrical connection to the bushing 25f. The entire assemblage is held in place on the panel 1, by a nut 40, which engages the lower threaded portion of the element 34. It is thus seen that any current which leaks through or around bushing 36 and washer 37, will be intercepted by the metallic element 25f. In this way, leakage of current to the insulating panel 1, is prevented.

The magnitudes of the currents in the "current" and "potential" circuits are very different. The current flowing in the former may be of the order of 0.5 ampere, while that flowing in the "potential" circuit will generally be barely sufficient to cause an indication on the galvanometer 6; of the order of $10^{-7}$ amperes. There is thus a serious danger of leakage of current from the "current" circuit to the "potential" circuit, with the consequent invalidation of results of measurement. It is easily seen that current leaking from the circuit to the galvanometer may cause erroneous deflection of the galvanometer, entirely unrelated to measurements being made. The user will therefore obtain an erroneous reading for his measured potential. At the same time it is necessary to have both circuits on one panel for convenient operation. The controls for both circuits must be operated almost simultaneously, in the use of the apparatus. Further still, the milliammeter and galvanometer must be read as nearly simultaneously as possible, which necessitates their being placed in close proximity to one another. During the time it might take an observer to move his eye from the galvanometer to say, an externally placed milliammeter, the value of the current in the "current" circuit might change enough to invalidate results.

Figure 2:
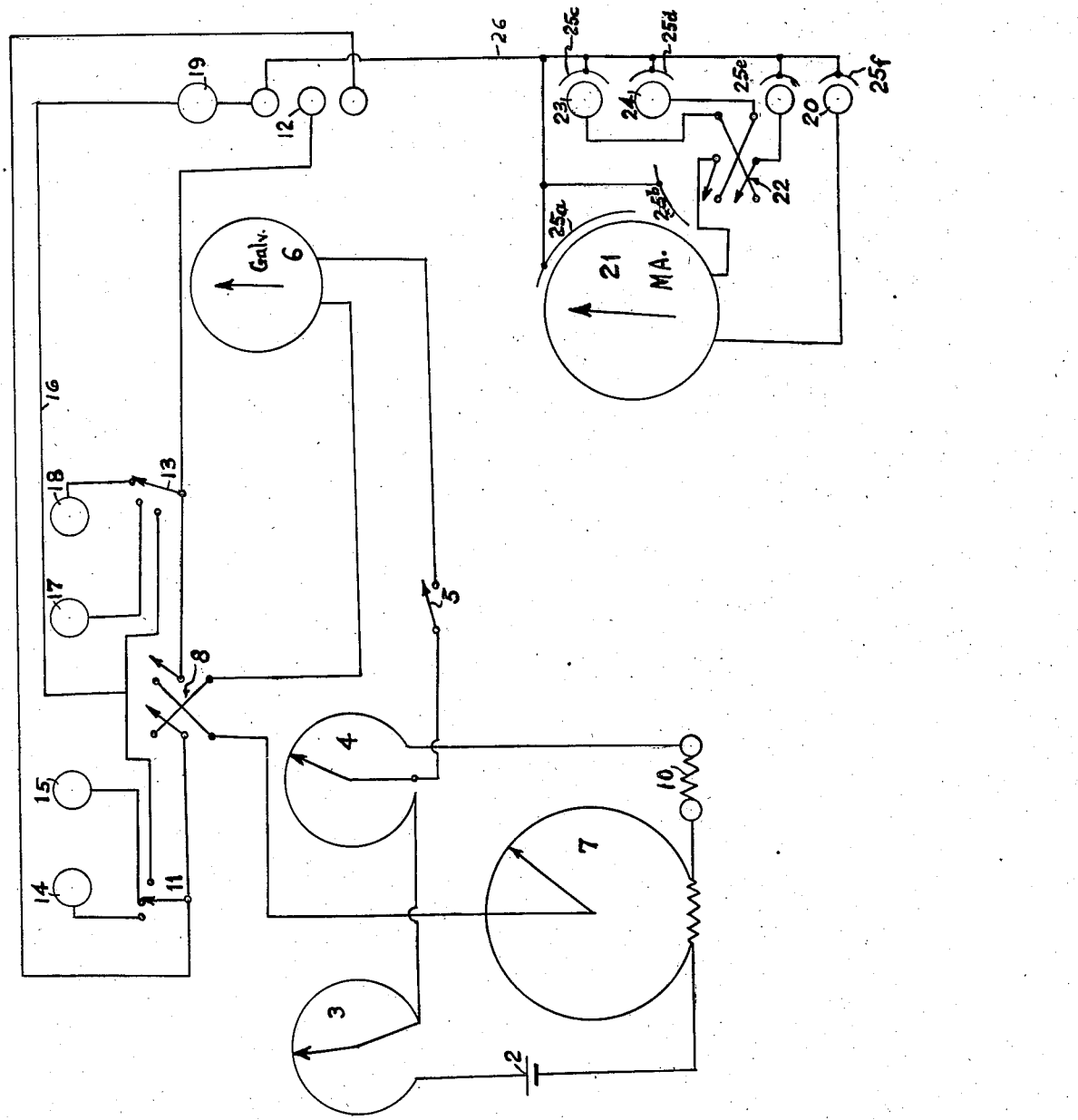
Fig. 2 is a wiring diagram of the apparatus.
Figure 4:
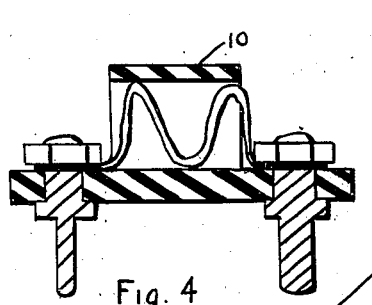
Fig. 4 shows a cross-sectional view, taken across plane 4—4 of Fig. 1, showing a special plug used in the apparatus.

For these reasons, the elements of both circuits are mounted upon the same panel of insulating material. To prevent the leakage of current above mentioned, each "current" element is surrounded by an insulating bushing, which in turn is surrounded by a conducting bushing. All the bushings, or shields, are connected to a common lead 26, as seen in Fig. 2, and are further connected to a binding post 19, which may be maintained at any convenient potential. A common, and convenient potential is that of the earth in the immediate vicinity of the apparatus.

As is common with potentiometric circuits of the type described herein, it is necessary to adjust the current flowing through the slide wire circuit to a definite standard value, so that there will be a definite and known potential drop across the slide wire element. Ordinarily this is done with the aid of a standard cell, but as indicated herein, it is the desire of applicant to obviate the need for the standard cell and to utilize instead the current measuring element which must be used in the apparatus for other purposes. The methods of standardizing described herein, are intended to allow the user to obtain a definite and known slide wire current in his slide wire circuit. The procedures are as follows:

*Standardizing—Method I*

This is shown in Fig. 5. Plug 10 is removed from jack 9, and plug 28 inserted in its stead. Plug 29 is inserted in jack 20. A short-circuiting wire is connected across binding posts 23 and 24. Rheostat 3 is now manipulated until the current flowing in the "slide wire" circuit, as indicated in the milliammeter 21, is that determined to be the correct value in the initial calibration of the instrument. Plugs 28 and 29 are now removed, and plug 10 reinserted in jack 9. The instrument is now ready for use.

*Standardizing—Method II*

Figure 8:
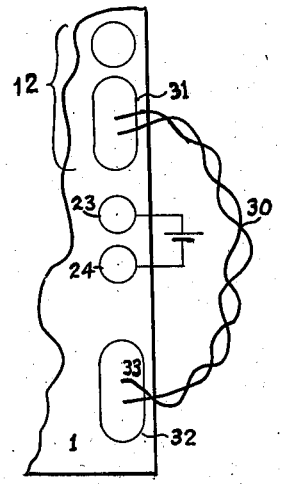
Fig. 8 is a diagrammatic view of the panel of the apparatus showing connections made for standardizing with the assembly shown in Fig. 6.

This is shown in Fig. 8. Plug 32 is inserted into jack 20, and plug 31 inserted into two of the contacts of jack 12. A battery is connected across binding posts 23 and 24. A current will now be indicated as flowing through the standard resistance 33. Knowing the value of the current and of the resistance, the voltage drop across the latter can be easily computed. The slide wires 7 and 4 are manipulated so as to indicate this voltage. Key 5 is next closed, and rheostat 3 manipulated till a balance is indicated. The instrument is now standardized. Plugs 31 and 32 are next removed, as is the battery across binding posts 23 and 24. The instrument is now ready for use. It is understood that the positions of switches 8 and 22 must correspond when following this standardizing technique.

*Checking "potential" circuit*

A check on the "potential" circuit may be had by short circuiting the terminals across which the E. M. F. to be measured is connected. This is done conveniently by operating switches 11 and 13 so as to make contact with common wire 16. In this position, the indicated E. M. F. should be zero. It is sometimes desirable, during this test, to bring both sides of the circuit to a known potential, usually that of the ground in the immediate vicinity of the instrument. This may be accomplished by connecting binding post 19 to the desired source of potential.

The mode of making the earth resistivity measurements will best be understood by a reference to the prior art patents, such as that to Gish, No. 1,813,845, or that to Slichter, No. 1,826,961.

*Making direct current earth resistivity measurement*

Figure 9:
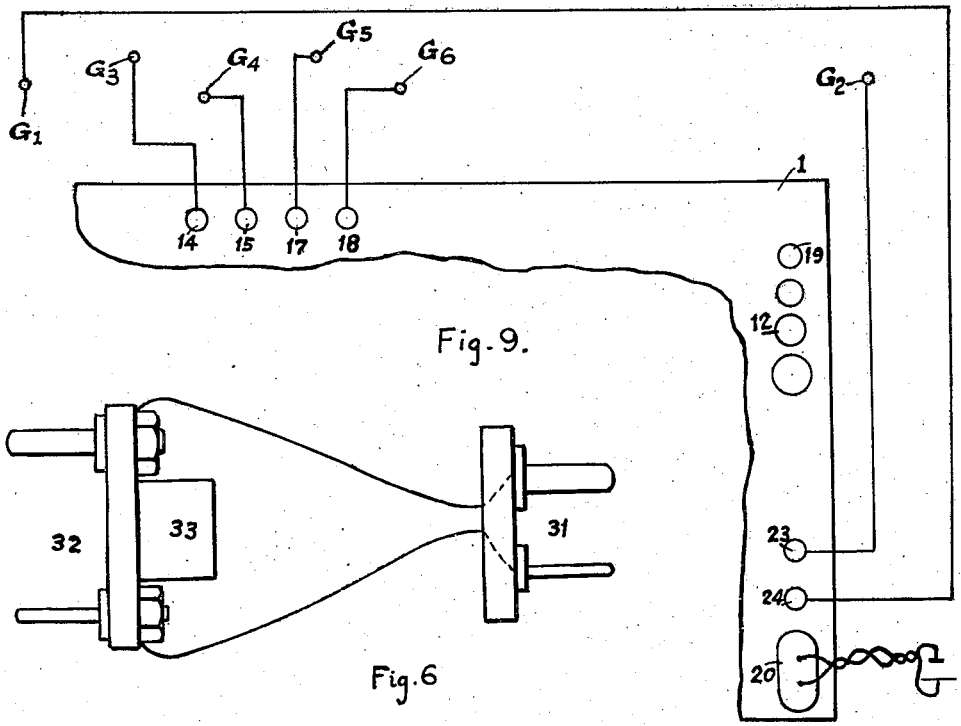
Fig. 9 is a diagrammatic view of the apparatus, showing connections made for following one measuring technique.

Connection is made as shown diagrammatically in Fig. 9. A plug connected to a source of current is inserted into plug 20. Binding posts 23 and 24 are connected to a pair of ground stakes G1 and G2. Binding posts 14, 15, 17, and 18, are respectively connected to ground stakes G3, G4, G5, G6. Switch 8 is held in position "a," and switch 22 held in position "c." Switches 11 and 13 are manipulated so as to include between their contacts, leads connected to the ground stakes between which it is desired to measure potential difference. The E. M. F. between switches 11 and 13 is now measured with the "potential" circuit used as a potentiometer. If it is desired to take readings in the reverse direction of the current, so as to eliminate the effects of polarization, ground currents, etc., at the terminals, switch 22 can be moved to position "d" and switch 8 to position "b," and the measurements repeated as before. It is understood that the current as indicated on the milliammeter is read as nearly simultaneously as possible with the reading of E. M. F.

*Making commutated direct current earth resistivity measurement*

The technique for this measurement is described in the patent to Gish, U. S. 1,813,845. To adapt the apparatus described herein for this technique, the set-up shown in Fig. 9 is adopted. Connection to the "current" circuit is made through a plug adapted to fit into jack 20. Connection to the "potential" circuit is made through a three-pronged plug, adapted to fit into jack 12. The prong of the plug which fits into the contact of the jack attached to lead 19, serves to connect the shielding system of the commutator to the system 25 of the apparatus. A rheostat is inserted between binding posts 23 and 24, to limit the current flowing in the "current" circuit. In some cases the rheostat is found unnecessary, and a short circuiting wire is placed across the binding posts. In the use of the commutator, the switch 8 serves to check the former for any bias. The check is made by reversing the battery leads to the commutator, reversing the current plug at the commutator, and throwing the switch 8 from its first position to reverse.

It will be understood that due to very slight mechanical imperfections in the commutator, or due to parasitic effects in the commutator due to thermoelectricity, and other causes, the commutator may give slightly different results for current fed into it for one polarity than it would give for current fed at another polarity. It is important in using the apparatus to know the extent of this bias, as it is sometimes called. If a marked bias developed, it would invalidate results, or at least introduce a considerable error therein. The method described immediately above allows one to determine the commutator bias conveniently by means of the control and the connecting elements mounted on the panel.

While the shielding elements have been shown as placed about the components of the "current" system, it will be understood that they will serve their purpose if they are placed anywhere where they may intercept leakage between components of the "current" system and those of the "potential" system. Such shielding elements, whether placed about the components of the "current" or of the "potential" system, are considered as falling within the scope of the invention.

It is thus seen that a convenient and improved apparatus is provided for the purpose named, capable of being adapted to different measuring techniques by the mere re-arrangement of connections and the proper manipulation of switches. It is further seen that provision is made for calibrating and checking the apparatus by different methods. It is further seen that certain components of the apparatus serve differing functions, depending upon what method of calibration or what measuring technique is being employed. Thus switch 8 serves to reverse potential connections for one technique, and for determining commutator bias in another. Jack 12 serves for one method of calibration, and for making connection of the "potential" circuit to the commutator. Binding posts 23 and 24 serve for connecting a battery in one standardizing technique, for connecting earth terminals in another, and for inserting a rheostat in still another. Jack 20 serves for two methods of standardization, to make connection of a commutator in one technique, and for connecting a battery in another.

We claim:

1. In an electrical prospecting apparatus, a current circuit and a potential circuit, rigidly fixed members of both said circuits for making connections to the earth, and a cooperating calibrating member having elements registering mechanically with the members of both circuits, the calibrating member serving to connect temporarily simultaneously the current and potential circuits, the calibrating member having a resistance element serving to simulate the effect of an earth resistance of known value.

2. In an electrical prospecting apparatus, a current circuit and a potential circuit, the current circuit having a pair of terminals rigidly mounted in spaced relation to one another, a potential circuit having an additional pair of rigidly mounted terminals in spaced relation to one another, a calibrating member having a resistance of known value to permit comparison of the currents flowing in the said potential and current circuits, the said calibrating member having a pair of rigidly mounted members engaging with the rigidly mounted elements of the potential circuit and having an additional pair of rigidly mounted members engaging with the rigidly mounted members of the current circuit, the said calibrating member being easily applied to and completely removable from the respective terminals of the said current and potential circuits.

SHELLEY KRASNOW.
J. M. S. KAUFMAN.